(12) United States Patent
Jin et al.

(10) Patent No.: US 9,130,664 B2
(45) Date of Patent: Sep. 8, 2015

(54) WIRELESS COMMUNICATIONS USING A SOUND SIGNAL

(71) Applicant: Qualcomm Incorporated, San Diego, CA (US)

(72) Inventors: Minho Jin, Anyang (KR); Taesu Kim, Seoul (KR); Young-Ki Baik, Seoul (KR); Minsub Lee, Seoul (KR); Duck Hoon Kim, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/653,910

(22) Filed: Oct. 17, 2012

(65) Prior Publication Data
US 2014/0108780 A1   Apr. 17, 2014

(51) Int. Cl.
*H04B 11/00* (2006.01)
*H04L 9/30* (2006.01)
*G06F 21/10* (2013.01)
*G06F 21/40* (2013.01)

(52) U.S. Cl.
CPC .................................... *H04B 11/00* (2013.01)

(58) Field of Classification Search
CPC ..... G06F 21/60; G06F 21/72; G06F 12/1408; G06F 21/606; G06F 21/554; G06F 21/602; G06F 2221/2107; G06F 9/30145; H04L 63/0428; H04L 9/3263; H04L 9/085; H04L 9/3073; H04H 60/23
USPC ............ 380/200, 223, 277–279, 42; 713/171, 713/190–191; 716/26
See application file for complete search history.

(56) References Cited

U.S. PATENT DOCUMENTS

| | | | |
|---|---|---|---|
| 7,251,730 B2 | 7/2007 | Rose et al. | |
| 8,429,407 B2 * | 4/2013 | Os et al. | 713/171 |
| 2001/0054147 A1 * | 12/2001 | Richards | 713/172 |
| 2002/0132651 A1 * | 9/2002 | Jinnouchi | 455/573 |
| 2003/0112978 A1 * | 6/2003 | Rodman et al. | 380/277 |
| 2005/0273609 A1 * | 12/2005 | Eronen | 713/171 |
| 2007/0129012 A1 | 6/2007 | Snow | |
| 2009/0233551 A1 | 9/2009 | Haartsen et al. | |
| 2011/0191253 A1 | 8/2011 | Pilskalns | |
| 2011/0237274 A1 | 9/2011 | Wong et al. | |
| 2011/0238192 A1 | 9/2011 | Shah et al. | |
| 2012/0209132 A1 * | 8/2012 | Jones et al. | 600/528 |
| 2012/0214416 A1 | 8/2012 | Kent et al. | |

FOREIGN PATENT DOCUMENTS

WO    WO2004057361 A1    7/2004
WO    2011042748 A2    4/2011

OTHER PUBLICATIONS

International Search Report and Written Opinion for International Application No. PCT/US2013/064141, Mailed on Jan. 8, 2014, 11 pages.

* cited by examiner

*Primary Examiner* — Michael Chao
*Assistant Examiner* — Shiuh-Huei Ku
(74) *Attorney, Agent, or Firm* — Toler Law Group, PC

(57) ABSTRACT

A method for communicating messages by a mobile device via a sound medium is disclosed. The mobile device receives input sounds from at least one mobile device via the sound medium. From the input sounds, an input sound signal carrying a first message encoded with a first key is detected. The mobile device decodes the first message based on a matching key. An output sound signal carrying a second message encoded with a second key is generated. Further, the mobile device transmits an output sound corresponding to the output sound signal via the sound medium.

46 Claims, 16 Drawing Sheets

WIRELESS COMMUNICATIONS USING A SOUND SIGNAL

TECHNICAL FIELD

The present disclosure relates generally to communicating with at least one device in a communication network. More specifically, the present disclosure relates to a system and method for communicating messages between mobile devices using sound signals.

BACKGROUND

In the past, wireless communication networks have been generally used for only voice communications for mobile device users. However, the recent trend for these users of the mobile devices is to use the wireless communication networks not only for voice communications, but also for a variety of data communications. Thus, as a demand for faster data communications has significantly increased, wireless communication networks, such as WLAN or Bluetooth, are widely used for such data communications. However, due to their longer connection time and faster battery consumption, some mobile devices have been used to receive messages in the form of sound signals.

In conventional wireless communication networks using sound signals, a mobile device typically receives sound signals from a marker, which broadcasts messages in the form of sound signals to mobile devices located within a sound propagation range. In such broadcast mode, the marker is generally configured to broadcast messages to any devices within the local sound propagation area. As such, the communications between the marker and the mobile devices are typically unidirectional from the marker to the mobile devices. Further, since the marker broadcasts the sound signals to mobile devices in a localized region, it typically lacks the capability to transmit messages to specific mobile devices in a secure manner.

Thus, there is a need for a system and method that allows secure bi-directional communication of messages via a sound medium without requiring a lengthy connection time with mobile devices.

SUMMARY

The present disclosure provides methods and apparatus for communicating messages among mobile devices via a sound medium. In these methods and apparatus, when a sound signal carrying a message encoded with a key is received by a mobile device, the message is decoded based on a matching key. In response to the decoded message, an output sound signal carrying a response message encoded with a different key is generated and is output by the mobile device.

According to an aspect of the present disclosure, a method for communicating messages by a mobile device via a sound medium is disclosed. The mobile device receives input sounds from at least one mobile device via the sound medium. From the input sounds, an input sound signal carrying a first message encoded with a first key is detected. The mobile device decodes the first message based on a matching key. An output sound signal carrying a second message encoded with a second key is generated. Further, the mobile device transmits an output sound corresponding to the output sound signal via the sound medium. This disclosure also describes an apparatus, a combination of means, and a computer-readable medium relating to this method.

According to another aspect of the present disclosure, an apparatus for communicating messages via a sound medium is disclosed. The apparatus includes a sound receiver, a sound signal analyzer, a decoding unit, a sound signal generator and a sound transmitter. The sound receiver is configured to receive input sounds from at least one mobile device via the sound medium and convert the input sounds into input sound signals, and the sound signal analyzer is configured to detect, from the input sounds, an input sound signal carrying a first message encoded with a first key. Further, the decoding unit is configured to decode the first message with the first key based on a matching key, and the sound signal generator is configured to generate an output sound signal carrying a second message encoded with a second key. Additionally, the sound transmitter is configured to transmit an output sound corresponding to the output sound signal via the sound medium.

According to another aspect of the present disclosure, a system for communicating messages among a plurality of mobile devices via a sound medium is disclosed. The system includes a first mobile device and a second mobile device. The first mobile device is configured to transmit a first sound signal carrying a first message encoded with a first key to the plurality of mobile devices. Also, the second mobile device is configured to receive the first sound signal and decode the first message with the first key based on a matching key. The second mobile device is further configured to generate and transmit a second sound signal carrying a second message encoded with a second key.

BRIEF DESCRIPTION OF THE DRAWINGS

Embodiments of the inventive aspects of this disclosure will be understood with reference to the following detailed description, when read in conjunction with the accompanying drawings.

DETAILED DESCRIPTION

Reference will now be made in detail to various embodiments, examples of which are illustrated in the accompanying drawings. In the following detailed description, numerous specific details are set forth in order to provide a thorough understanding of the inventive aspects of this disclosure. However, it will be apparent to one of ordinary skill in the art that the inventive aspects of this disclosure may be practiced without these specific details. In other instances, well-known methods, procedures, systems, and components have not been described in detail so as not to unnecessarily obscure aspects of the various embodiments.

Figure 1:
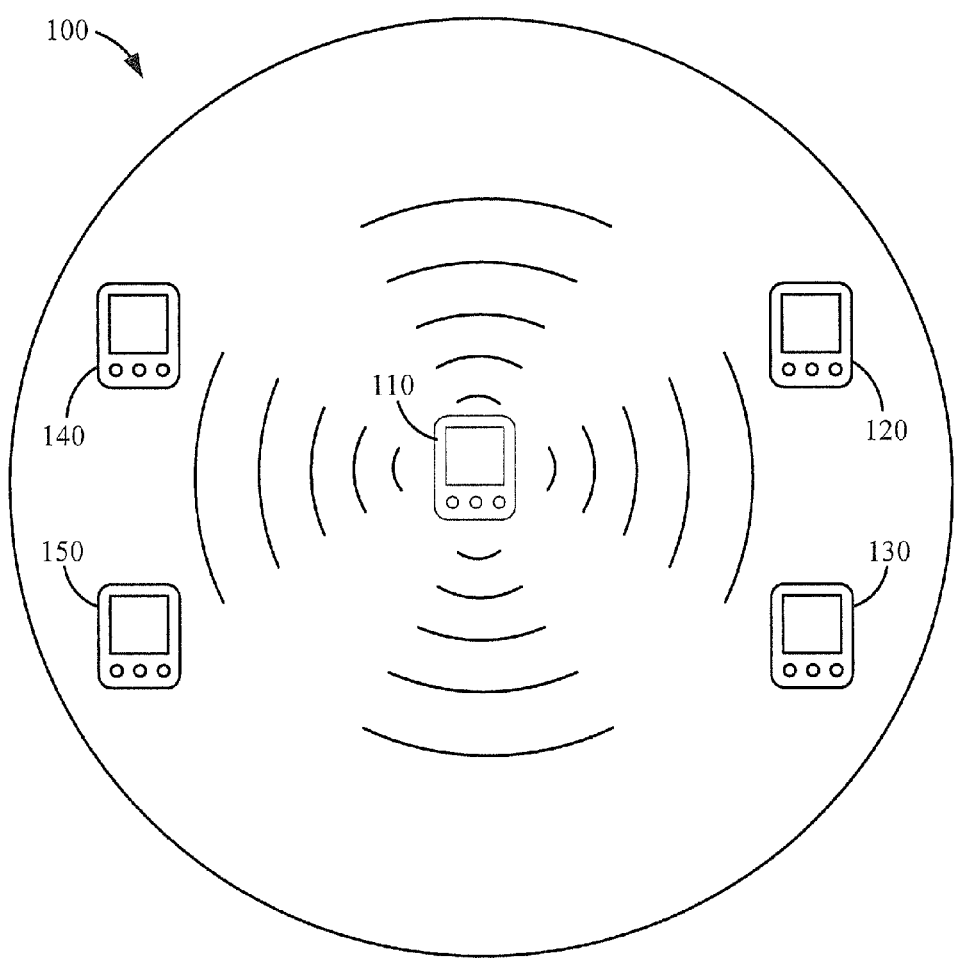
FIG. 1 illustrates a sound communication region in which a mobile device communicates with other mobile devices using a sound signal according to one embodiment of the present disclosure.

FIG. 1 illustrates a sound communication region 100 in which a mobile device 110 communicates with other mobile devices 120, 130, 140, and 150 using a sound signal according to one embodiment. For sound communication, each of the mobile devices 110 to 150 includes a sound transmitter such as one or more speakers and a sound receiver such as one or more microphones, where the sound signal may be an audible or inaudible sound signal. In some embodiments, a beacon signal may be defined as having a frequency range between 16 kHz and 22 kHz, which is substantially inaudible to human ears, and can be easily produced by conventional speakers included in the sound transmitter. The sound communication region 100 defines an area (e.g., a room) within which the mobile device 110 may communicate with other mobile devices 120, 130, 140, and 150 using short-range sound communication technologies. The mobile devices 110 to 150 may be a portable computing device such as a tablet PC, a smartphone, a gaming device, and the like, and may include any standard components and functions of such devices.

For communication with one or more mobile devices 120, 130, 140, and 150, the mobile device 110 generates an encoded message and broadcasts a sound signal carrying the encoded message in the sound communication region 100. Each of the mobile devices 120 to 150 receives the encoded message and determines if it is the intended recipient (e.g., target device) of the encoded message. If so, the target device decodes the message, and may generate and broadcast a sound signal carrying a response message to the mobile device 110 or other mobile devices in the sound communication region 100. The number of mobile devices broadcasting sound signals is made for illustrative purposes only. Thus, a plurality of mobile devices may be located within the region 100. Further, it should be understood that the functions of the mobile device 110 as discussed above may be combined with any mobile device described in this disclosure.

Figure 2:
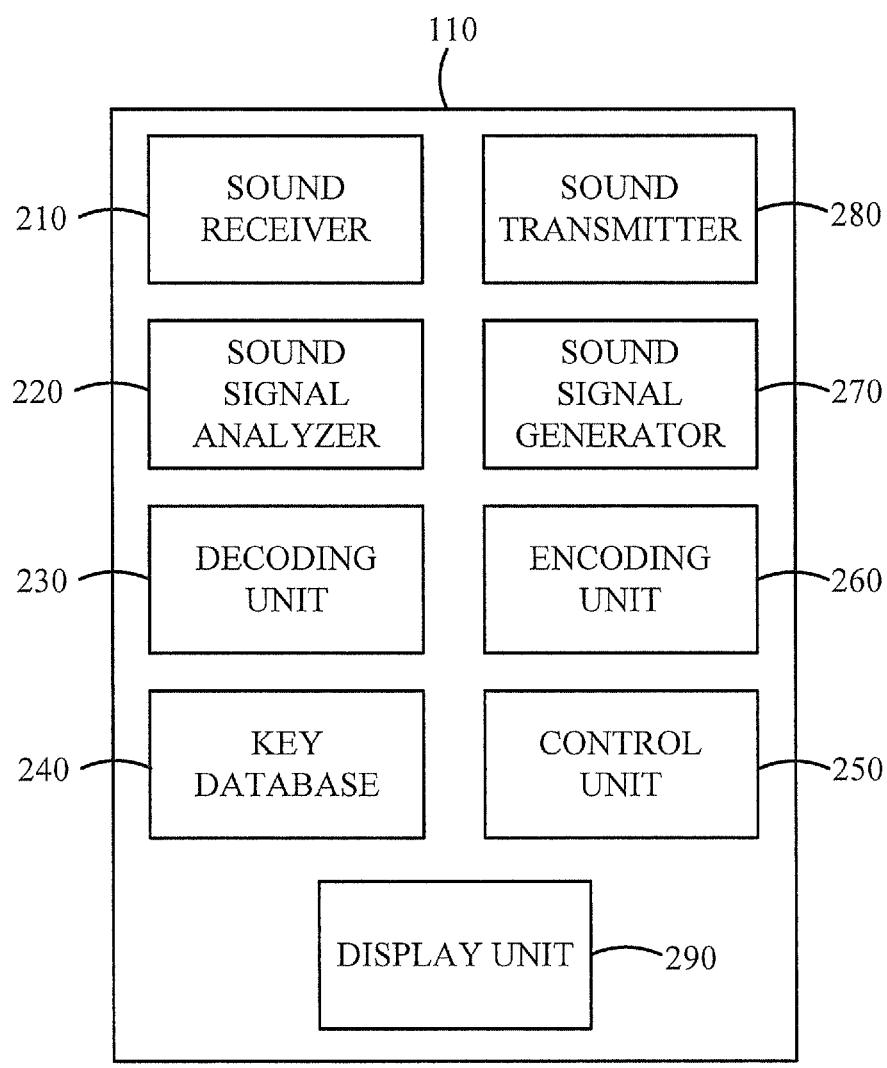
FIG. 2 is a detailed block diagram of a mobile device configured to communicate messages using sound signals according to one embodiment of the present disclosure.

FIG. 2 is a detailed block diagram of a mobile device 110, 120, 130, 140, or 150 configured to communicate messages using sound signals according to one embodiment of the present disclosure. In the illustrated embodiment, the mobile device 110 includes a sound receiver 210, a sound signal analyzer 220, a decoding unit 230, a key database 240, a control unit 250, an encoding unit 260, a sound signal generator 270, a sound transmitter 280, and a display unit 290. The mobile device 110 may also include any suitable components that can be used for communication.

The mobile device 110 is configured to communicate messages by receiving and sending encoded sound messages. When the sound messages are received, the messages are processed through the sound receiver 210, the sound signal analyzer 220, the decoding unit 230, the key database 240, the control unit 250, and the display unit 290. On the other hand, when the sound messages are to be transmitted, the messages are processed through the key database 240, the control unit 250, the encoding unit 260, the sound signal generator 270, the sound transmitter 280, and the display unit 290. In processing the messages as explained above, the control unit 250 is configured to control and manage the overall operations of the mobile device 110.

The sound receiver 210 is configured to receive sound signals from other mobile devices and convert the signals into electrical sound signals. The sound receiver 210 may include one or more microphones or a transducer having one or more transducer elements for receiving and converting the sound signals. The converted electrical sound signals from the sound receiver 210 are then provided to the sound signal analyzer 220.

The sound signal analyzer 220 determines if any of the electrical sound signals carries an encoded message. For example, the sound signal analyzer 220 may include an analog-to-digital (A/D) converter, which converts the electrical sound signals into digital signals, and determine whether the converted digital signal includes a message encoded with a predetermined key. The sound signal analyzer 220 then accesses the key database 240 to search for a key that matches the predetermined key. The key database 240 includes a plurality of predetermined keys that may be used to encode or decode messages. Further, the predetermined keys may be generated by using a well-known encryption technology, such as an RSA algorithm, or may be obtained from an external device.

When a key that matches the predetermined key is found from the key database 240, the sound signal analyzer 220 transmits the encoded message and the matching key from the key database 240 to the decoding unit 230. The decoding unit 230 is configured to receive and decode the encoded message by using the matching key to obtain an original message embedded in the received sound signal. Then, the control unit 250 then processes the original message for display on the display unit 290.

In some embodiments, the sound signal analyzer 220 may include a sound separator and a sound source identifying unit, which are used to determine a location of each source of the received sound signals. When an external sound is received by the sound receiver 210, the sound separator separates the external sound into a plurality of sound signals from different sound sources. Then, the sound source identifying unit may identify a sound source for each of the separated sound signals. Once the sound sources are identified, the control unit 250 may determine relative locations of the identified sound sources for display on the display unit 290 of the mobile device 110.

For communication with other mobile devices, the control unit 250 may generate an original message to be transmitted to one or more other mobile devices. For example, the control unit 250 may generate a message in response to a user input on the mobile device 110 or by executing an application configured to communicate with other mobile devices. The message may be a hyperlink to a website, a simple acknowledgement, a text message, or the like. The control unit 250 also may automatically or manually designate a mobile device in the sound communication region 100 to transmit the message.

For securely transmitting the message to intended recipients, the control unit 250 is configured to determine a key for encoding the message based on the intended recipient of the message. For example, a broadcast public key may be used to encode the message if the message is intended for all mobile devices in the sound communication region 100. In such case, all mobile devices in the sound communication region 100 may have a broadcast private key paired to the broadcast public key and may use the broadcast private key to decode the message encoded with the broadcast public key. Alternatively, a public key of one or more intended target mobile devices may be used to encode the message if the message is intended for one or more intended target mobile devices, which include a private key paired to the public key, in the sound communication region 100. In other words, a message encoded with a public key can only be decoded by using its paired private key in a public key infrastructure (PKI) encryption.

Based on the intended recipient, the encoding unit 260 accesses the key database 240 for a predetermined key to be used in encoding the message. The predetermined key is then provided to the encoding unit 260, which encodes the message with the predetermined key. The message encoded with the predetermined key is then transmitted to the sound signal generator 270.

The sound signal generator 270 is configured to generate a sound signal carrying the message encoded with the predetermined key. The sound signal generator 270 may include a digital-to-analog (D/A) converter, a frequency division multiplexing unit, a time division multiplexing unit, and/or a Code Division Multiple Access (CDMA) unit for converting the encoded message into an electrical sound signal. The sound signal carrying the encoded message is then provided to the sound transmitter 280 to be transmitted to the intended recipient. The sound transmitter 280 may include one or more speakers or one or more transducers to convert the electrical sound signal into a sound signal carrying the encoded message for output. With two or more speakers, the sound transmitter 280 may determine and select a direction to which the sound travels. After converting the electrical sound signal, the sound transmitter 280 transmits the sound signal to mobile devices in the sound communication region 100.

In some embodiments, the sound signal generator 270 may determine a frequency band and/or a time at which the sound signal is broadcast to enhance communication speed. For example, the frequency division multiplexing unit of the sound signal generator 270 may perform a frequency division multiplexing by dividing the entire bandwidth available to the system, in which the sound signal may travel, into a series of non-overlapping frequency bands. By performing the frequency division multiplexing, the sound signal generator 270 may determine and select a frequency band with less traffic. For a beacon signal, which may be an inaudible sound signal, the sound signal generator 270 may determine a frequency with less traffic for the beacon signal to be output based on the result of the frequency division multiplexing.

Additionally or alternatively, the sound signal generator 270 may perform a time division multiplexing using the time division multiplexing unit. The time division multiplexing unit divides the time domain into recurrent time slots of a fixed length so that two or more signals may be transmitted simultaneously as sub-channels in one communication channel. For example, if the user of the mobile device 110 wishes to transmit two different messages concurrently to two different groups, then the two messages may be transmitted to two different groups simultaneously by performing the time division multiplexing. Further, a method of Code Division Multiple Access (CDMA), which is well known in the art, may be employed by the sound signal generator 270 for communication. The sound signal generator 270 may also control the time at which the sound signal should be output. In other words, the sound signal generator 270 may determine a time when the traffic is low and control the time for the beacon signal to be output.

Each of the components of the mobile device 110 may perform the above discussed functions as one unit or the functions may be separated into multiple units. Further, any of the above components of the mobile device 110 may be combined with each other. Additionally, it should be understood that these components may be combined with any mobile device described in this disclosure.

Figure 3:
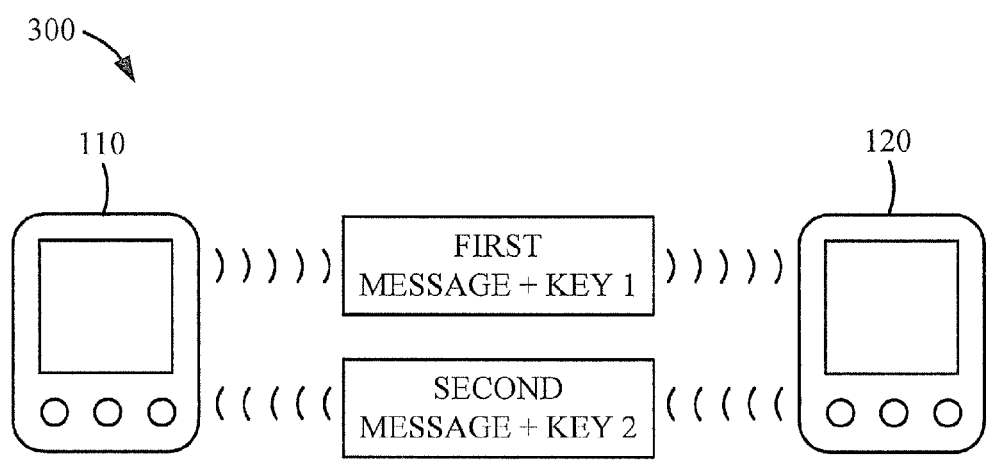
FIG. 3 illustrates a communication system in which mobile devices communicate messages encoded with a key via a sound medium according to one embodiment of the present disclosure.

FIG. 3 illustrates a communication system 300 in which the mobile devices 110 and 120 communicate messages encoded with a key via a sound medium according to one embodiment of the present disclosure. For secure communication, the mobile devices 110 and 120 communicate with each other using messages encoded with predetermined keys, which are stored and updated in a key database such as the key database 240 of the mobile devices 110 and 120. Although the communication system 300 illustrates using two mobile devices 110 and 120, it may also include any number of mobile devices for communication.

In one embodiment, the mobile devices 110 and 120 are configured with a pair of broadcast public and private keys that can be used for communicating with other mobile devices in the communication system 300. For example, the broadcast public and private keys may be stored and updated in the key database 240 in each of the mobile devices 110 and 120 or may be obtained from an external source, such as a server. In addition, the mobile devices 110 and 120 may obtain predetermined keys of target mobile devices from an external source, such as a server, which stores a key database of mobile devices including the mobile devices 110 and 120. Alternatively, the mobile devices 110 and 120 may obtain predetermined keys of target mobile devices by requesting and receiving a public key from a target mobile device wirelessly over a communication network, such as a sound communication network. The broadcast public key and/or public keys of target mobile devices are stored and updated in each of the mobile devices 110 and 120.

In the communication system 300, the mobile device 110 transmits a sound signal carrying a first message encoded with a first key "KEY 1" to the mobile device 120. The first key may be a public key of the mobile device 120 that is used to encode the first message. The mobile device 120 receives the first message encoded with the first key and decodes the message with its unique private key which is paired to the public key and known only to the mobile device 120. The private key and the public key are mathematically linked such that only the private key can be used to decode the message encoded with the public key. In this manner, although other mobile device may receive the message from the mobile device 110, only the mobile device 120 can decode the message.

In the case of a broadcast message, the mobile device 110 may broadcast the message to all mobile devices located within a sound communication region using a broadcast public key. For example, the mobile device 110 may encode a message (e.g., a business card, contact information, an invitation, and the like) with a broadcast public key that is known to all of the mobile devices within the sound communication region, and broadcast the encoded message. The encoded message is then received and decoded by all of the mobile devices within the sound communication region using a broadcast private key paired to the broadcast public key.

Figure 4:
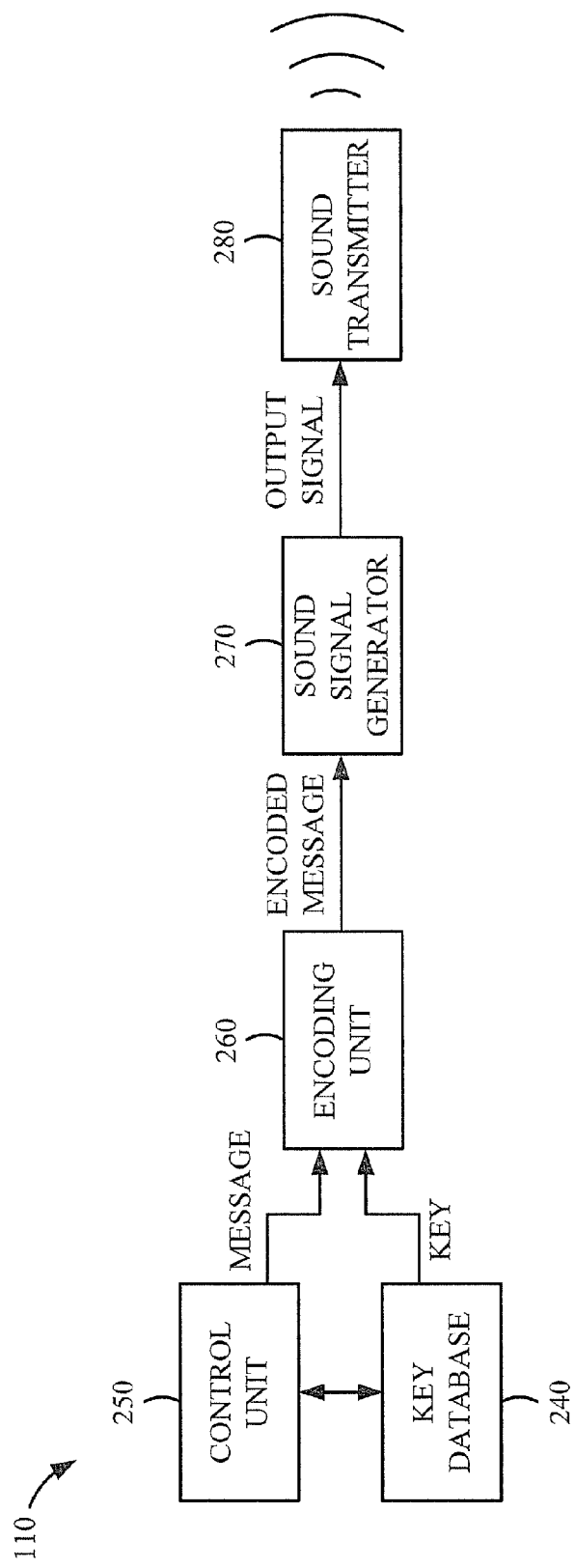
FIG. 4 illustrates a block diagram of a mobile device for transmitting a sound signal carrying a message via a sound medium according to one embodiment of the present disclosure.

FIG. 4 illustrates a block diagram of the mobile device 110 for transmitting a sound signal carrying a message via a sound medium according to one embodiment of the present disclosure. Initially, the control unit 250 generates a message to be broadcast to other mobile devices in the sound communication region 100 and determines one or more target devices for the message. The control unit 250 then provides a control signal to the key database 240 to output an encryption key (e.g., a public key of one or more target mobile devices or a broadcast public key) associated with the one or more target devices. The key database 240 provides the encryption key to the encoding unit 260 for use in encoding the message.

The encoding unit 260 receives the message and the encryption key from the control unit 250 and the key database 240, respectively, and encodes the message with the encryption key. The encoded message is then provided to the sound signal generator 270, which is configured to generate an output signal such as an electrical sound signal carrying the encoded message. The sound transmitter 280 receives the electrical sound signal from the sound signal generator 270, and converts the electrical sound signal into a sound signal to be transmitted over the sound medium.

Figure 5:
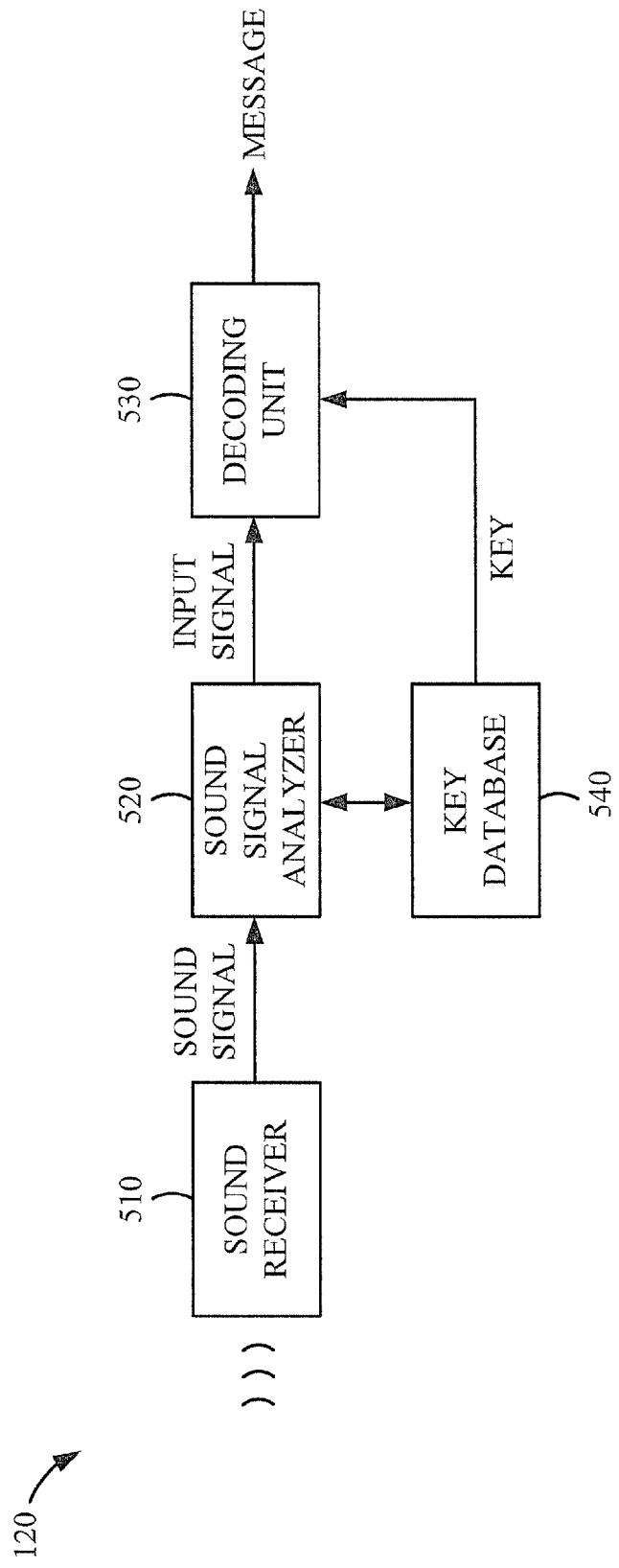
FIG. 5 illustrates a block diagram of a mobile device for receiving a sound signal carrying a message via the sound medium according to one embodiment of the present disclosure.

FIG. 5 illustrates a block diagram of the mobile device 120 for receiving a sound signal carrying a message via the sound medium according to one embodiment of the present disclosure. Similar to the mobile device 110 in FIG. 2, the mobile device 120 also includes a sound receiver 510, a sound signal analyzer 520, a decoding unit 530 and a key database 540. Initially, the sound receiver 510 of the mobile device 120 receives sound signals and converts the sound signals into electrical sound signals.

The converted electrical sound signals are provided to the sound signal analyzer 520, which first converts the electrical signals into digital input signals including the encoded message. The sound signal analyzer 520 then determines whether a message is included in at least one of the received sound signals, and if so, whether the message is encoded. If the message is found to be encoded, the sound signal analyzer 520 determines whether the message may be decoded using a private key or a broadcast private key and searches for a matching decryption key in the key database 540. The decoding unit 530, which is configured to decode the encoded message, receives the matching key and the digital input signal from the key database 540 and the sound signal analyzer 520, respectively. Then, the decoded message is output on a display unit of the mobile device 120.

In another embodiment, the mobile device 120 may also respond to the message, which may be received from the mobile device 110. Similar to the mobile device 110, the mobile device 120 may include a sound transmitter such as the sound transmitter 280, a sound signal generator such as the sound signal generator 270, an encoding unit such as the encoding unit 260 and a control unit such as the control unit 290. As discussed above with reference to the mobile device 110 in FIG. 2, the mobile device 120 may generate a response message, encode the response message with a predetermined key, convert the encoded message into a sound signal, and broadcast the sound signal.

In some embodiments, the mobile device 120 may ignore the broadcast message, or broadcast a completely unrelated message. Further, in response to a received message, the mobile device 120 may or may not generate a response message encoded in the same manner as encryption process of the received message. For example, even if the message was encoded with a broadcast public key, the response message may or may not be encoded with the broadcast public key.

Figure 6:
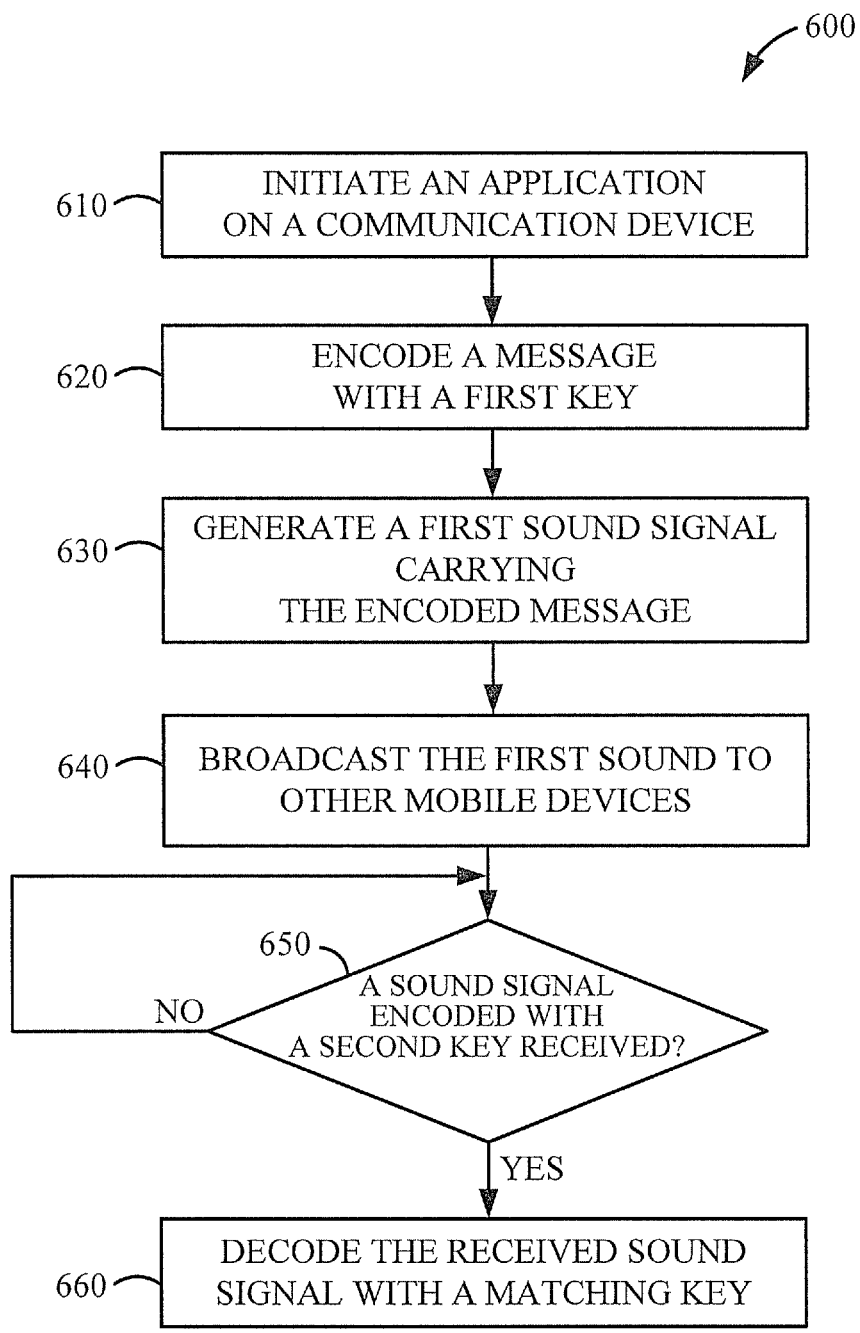
FIG. 6 is a flow chart illustrating a method, performed by a communication device, for communicating messages with other mobile devices using sound signals according to one embodiment of the present disclosure.

FIG. 6 is a flow chart illustrating a method 600, performed by a communication device such as the mobile device 110, for communicating messages with other mobile devices using sound signals according to one embodiment of the present disclosure. The communication device may be a portable computing device such as a tablet PC, a smart-phone, a gaming device, and the like, or a stationary computing device including a personal computer, a server, and the like.

In the method 600, the communication device initiates a communication application for communicating messages with other mobile devices over a sound medium in a sound communication region, at 610. The communication device generates and encodes a message with a first key selected from a key database, at 620. Based on intended target mobile devices, the first key may be a broadcast public key or a public key of the intended target mobile devices. Although the message is broadcast over the sound medium, the message may only be decoded by mobile devices having a key that matches the first key. The communication device then generates a first sound signal carrying the encoded message, at 630. The first sound signal is broadcast to other communication devices such as the mobile devices 120 to 150, at 640, and may be decoded by the mobile devices having a matching decryption key associated with the first key. In response to the broadcast message from the communication device, the other communication devices, which have decoded and analyzed the broadcast message, may broadcast a sound signal carrying a response message encoded with a second key. Then, the communication device may receive the sound signal carrying the response message encoded with the second key, at 650. If so, the communication device obtains a matching key associated with the second key and decodes the message embedded in the received sound signal with the matching key, at 660.

Figure 7:
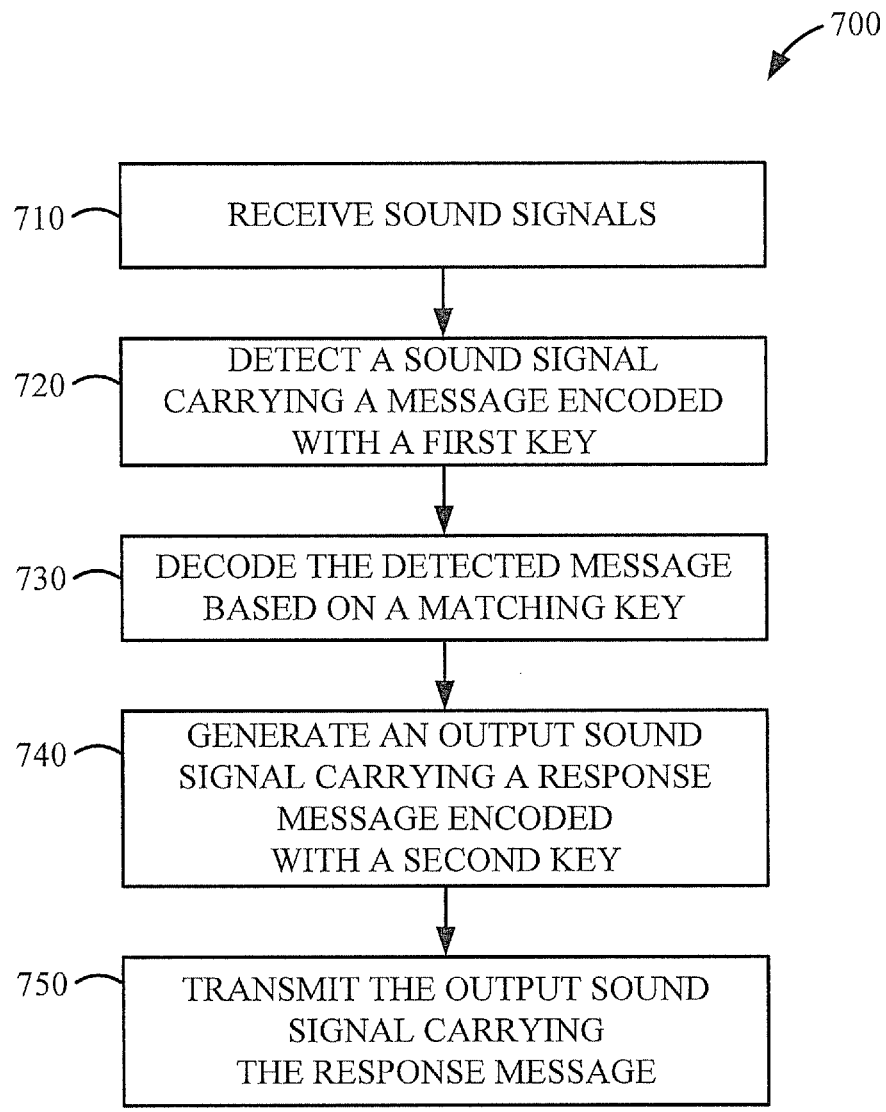
FIG. 7 is a flow chart illustrating a method, performed by a mobile device, for communicating messages with other communication devices using sound signals according to one embodiment of the present disclosure.

FIG. 7 is a flow chart illustrating a method 700, performed by a communication device such as the mobile device 120, for communicating messages with other communication devices using sound signals according to one embodiment of the present disclosure. In the method 700, the mobile device 120 initially receives sound signals, at 710. In performing this operation, the mobile device 120 may be in a sleep mode so that the mobile device 120 may decrease the battery consumption by turning off other functions except some necessary functions such as sound detection and processing. The mobile device 120 then determines whether the received sound signals carry a message or not. Based on the determination, the mobile device 120 detects a sound signal carrying a message encoded with a first key, at 720. If the mobile device 120 is in the sleep mode, the other functions of the mobile device 120 may be activated in response to the detected sound signal carrying the message encoded with the first key.

The message encoded with the first key is decoded with a matching key that matches the first key, at 730. The matching key may be obtained from the key database 240 of the mobile device 120. The decoded first message may be displayed on the display unit 290 of the mobile device 120. In response to the first message, the mobile device 120 generates and encodes a response message with a second key obtained from the key database 240 of the mobile device 120. The mobile device 120 then generates an output sound signal carrying the response message encoded with the second key, at 740. Lastly, the mobile device 120 transmits the output sound signal carrying the response message, at 760. In this configuration, the first key and second key may be a broadcast public key or a public key of one or more intended target mobile devices depending on the intended recipients.

Figure 8:
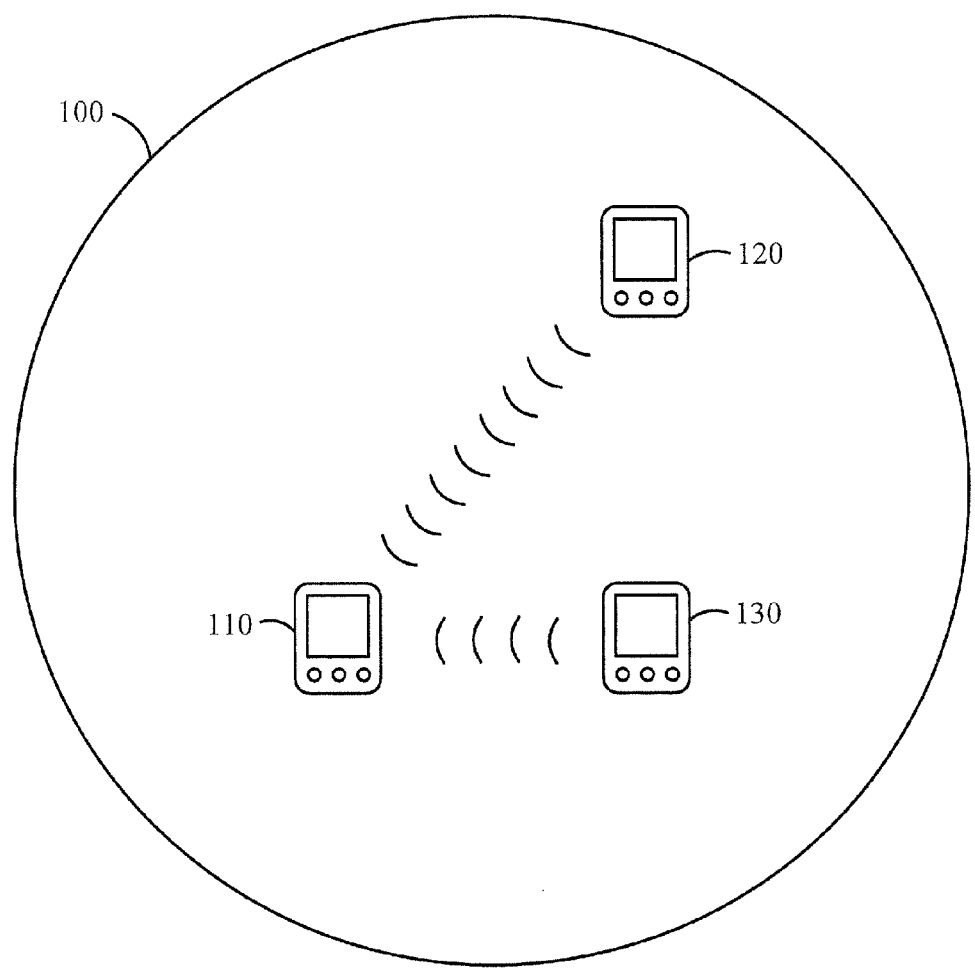
FIG. 8 illustrates a diagram of a mobile device in communication with other mobile devices for identifying locations of the other mobile devices according to one embodiment of the present disclosure.

FIG. 8 illustrates a diagram of the mobile device 110 in communication with the mobile devices 120 and 130 for identifying locations of the mobile devices 120 and 130 according to one embodiment of the present disclosure. When the mobile device 110 receives sound signals, which may or may not carry a message, from the mobile devices 120 and 130 within the sound communication range 100, it may determine locations of the mobile devices 120 and 130 using the sound separator and the sound source identifying unit as described above. For example, using a beamforming technique, the mobile device 110 may determine a directional and positional relationship between the mobile device 110 and each of the mobile devices 120 and 130. The relative locations of the mobile devices 120 and 130 are then displayed on a display of the mobile device 110. Based on the displayed locations of the mobile devices 120 and 130, either or both of the mobile devices 120 and 130 may be selected as a target mobile device for further communication.

Figure 9A:
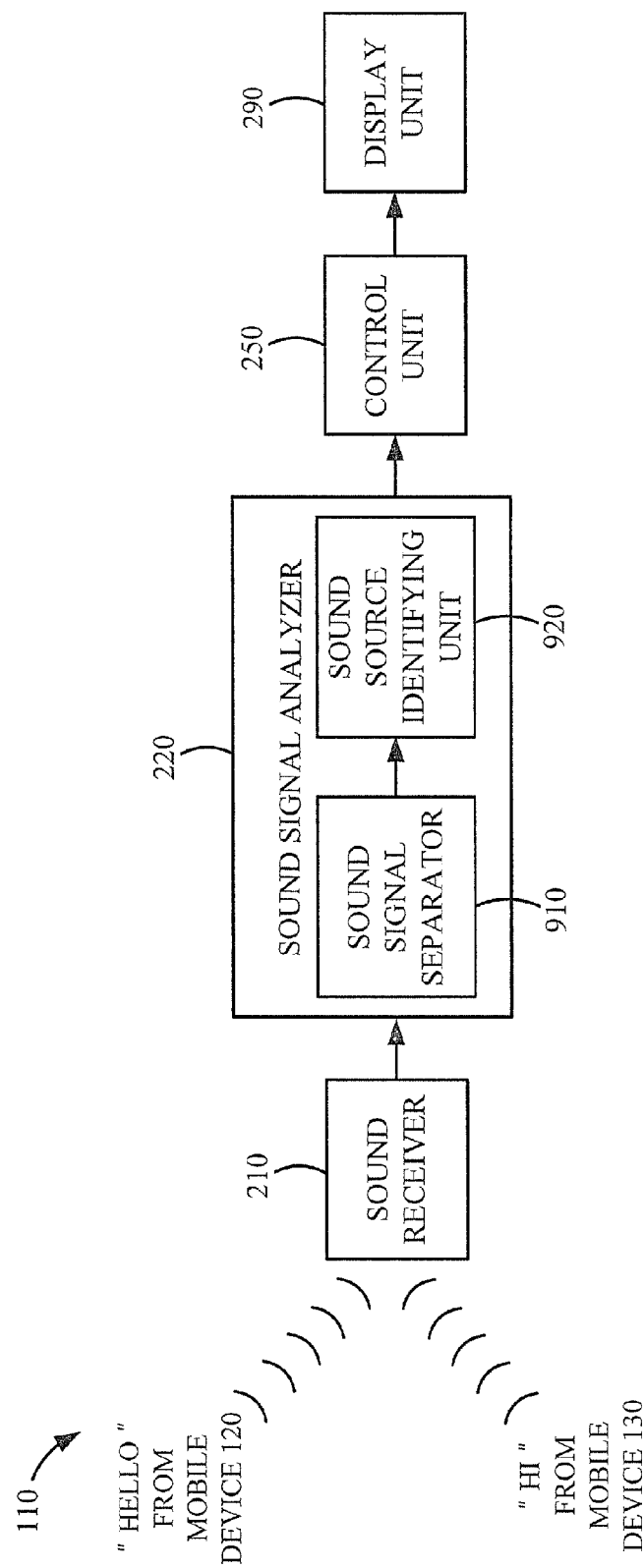
FIG. 9A illustrates a detailed block diagram of a mobile device configured to identify locations of other mobile devices based on received sound signals according to one embodiment of the present disclosure.

FIG. 9A illustrates a more detailed block diagram of the mobile device 110 configured to identify locations of the mobile devices 120 and 130 shown in FIG. 8 based on received sound signals according to one embodiment of the present disclosure. For identifying the locations of other mobile devices, the mobile device 110 includes the sound receiver 210, the sound signal analyzer 220, the control unit 250 and the display unit 290. The sound receiver 210 includes at least two microphones to resolve the locations of other mobile devices using a beamforming technique, in which each microphone receives sound signals corresponding to a beamforming channel. The sound signal analyzer 220 further includes a sound signal separator 910 and a sound source identifying unit 920. The control unit 250 is configured to display the relative locations of the identified mobile devices on the display unit 290 and process a user selection of target mobile devices for further communication.

The location of a mobile device may be defined by a direction of the mobile device and optionally a distance to the mobile device from the mobile device 110. The direction of the mobile device relative to the mobile device 110 may be determined by using at least two microphones or transducer elements in the sound receiver 210. For example, at least two microphones may be used to resolve sound signals from a source mobile device to determine a direction of the source mobile device relative to the mobile device 110. In order to determine the location of the source mobile device, the sound receiver 210 may be configured with at least three microphones to resolve sound signals from the source mobile device by a triangulation method.

As shown in FIG. 9A, the mobile device 120 may transmit a sound signal carrying a message "HELLO" and the mobile device 130 located at a different location may transmit a sound signal carrying a message "HI." The sound receiver 210 then receives the sound signals from the mobile devices 120 and 130. The sound signals are then provided to the sound signal separator 910, which is configured to separate the sound signals into the sound signals originating from the mobile devices 120 and 130.

The separated sound signals are then provided to the sound source identifying unit 920, which identifies the locations of the mobile devices 120 and 130 relative to the mobile device 110 by determining the direction and/or the distance of each of the mobile devices 120 and 130 with respect to the mobile device 110. For example, the sound source identifying unit 920 may determine that the mobile device 120 is located in a direction of 80 degrees and the mobile device 130 is located in a direction of 10 degrees with respect to the mobile device 110. In addition, the sound source identifying unit 920 may determine that the distances to the mobile devices 120 and 130 are about one meter and about two meters, respectively. Based on the directions and distances, the control unit 250 may calculate the relative locations of the mobile devices 120 and 130 to the mobile device 110 and provide the location data to the display unit 290 for display.

Figure 9B:
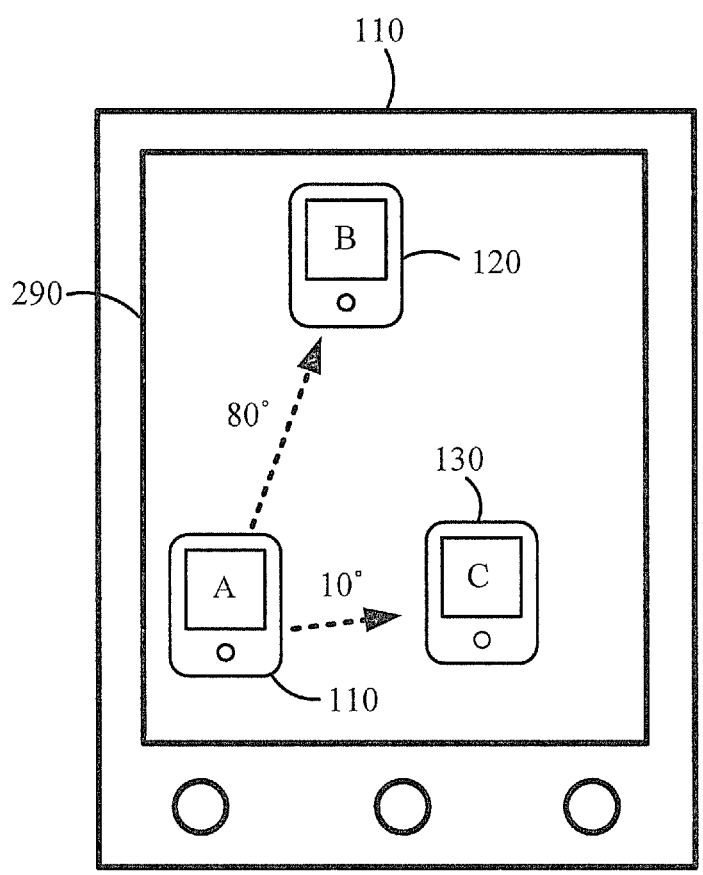
FIG. 9B illustrates a display unit of a mobile device displaying relative locations of the other mobile devices according to one embodiment of the present disclosure.

FIG. 9B illustrates the display unit 290 of the mobile device 110 displaying the locations of the mobile devices 110, 120, and 130 according to one embodiment of the present disclosure. Based on the relative location data of the mobile devices 120 and 130 from the control unit 250, the mobile device 110 is displayed at the bottom left corner of the display unit 290. Further, the mobile device 120 is shown at about 80 degrees with respect to the displayed mobile device 110 while the mobile device 130 is shown at about 10 degrees with respect to the displayed mobile device 110. The distance from the mobile device 130 is displayed to be about twice as long as the distance from the mobile device 120. In this manner, locations of mobile devices within a sound communication region may be determined and displayed on a mobile device.

In some embodiments, the mobile device 110 may selectively display other mobile devices that can communicate messages with the mobile device 110. For example, if only the mobile device 120 can communicate messages with the mobile device 110, while the other mobile device 130 cannot, the mobile device 110 may display only the mobile device 120.

Figure 10:
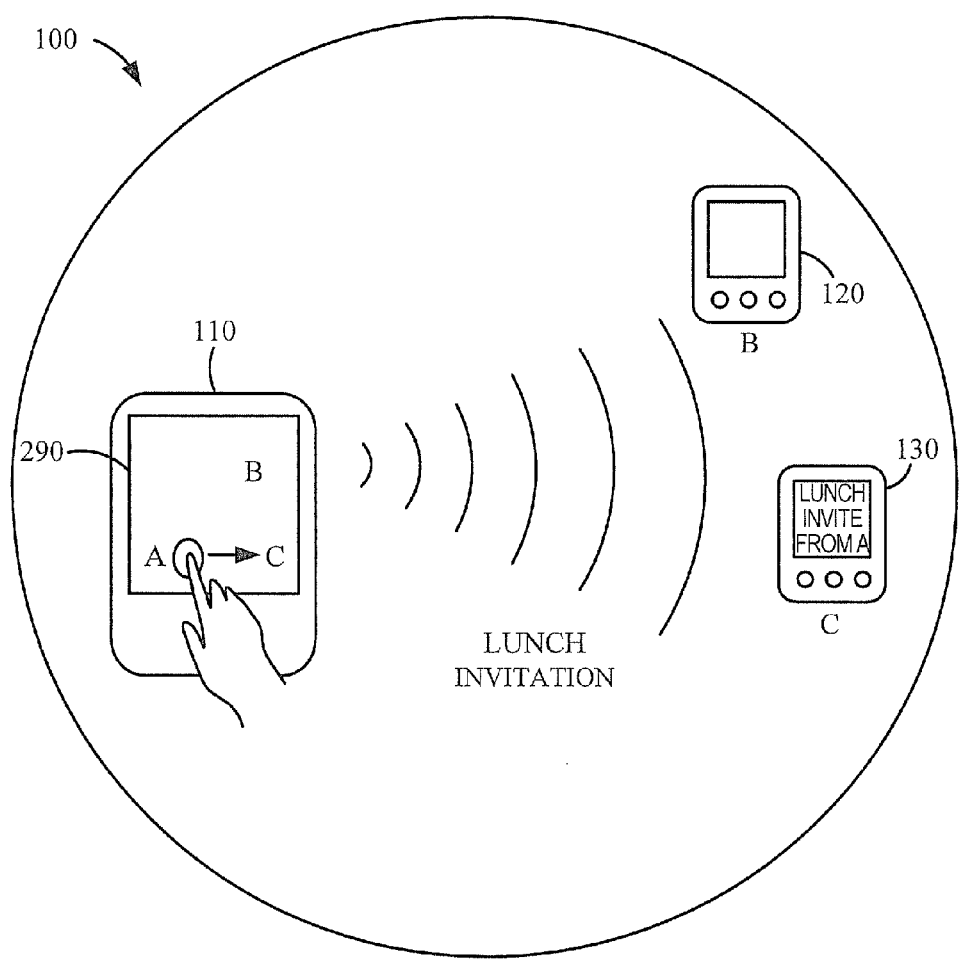
FIG. 10 illustrates a diagram of a mobile device configured to transmit a sound signal carrying a message to a target mobile device in response to a user input according to one embodiment of the present disclosure.

FIG. 10 illustrates a diagram of the mobile device 110 configured to transmit a sound signal carrying a message to the target mobile device 130 shown in FIG. 8 in response to a user input according to one embodiment of the present disclosure. In this configuration, the target mobile device 130 is an intended recipient of the message from the mobile device 110. The target mobile device 130 is configured to receive and decode the encoded message embedded in the sound signal transmitted from the mobile device 110.

In some embodiments, the mobile device 110 may allow a manual or automatic selection of the target mobile device 130 to which a message is to be sent using a sound signal. For example, the target mobile device 130 may be manually selected based on a touch input received on a touch-sensitive display unit 290 of the mobile device 110 from a user. The user may select the target mobile device 130 by touching the displayed target mobile device 130 on the display unit 290. Alternatively, the user may select the target mobile device 130 by touching the mobile device 110 and sliding toward the target mobile device 130 in a touch-and-slide motion (indicated by an arrow from A to C on the display unit 290 of the mobile device 110 in FIG. 10). In the case of an automatic selection, the mobile device 110 may automatically select a target mobile device when sending a message intended for one or more specific target devices. For example, the mobile device 110 may select a target mobile device, from which an encoded message was received. Thus, if a message is received from the mobile device 130, the mobile device 110 automatically selects the mobile device 130 as the target mobile device and transmits a message encoded with a public key of the target mobile device 130.

As shown in FIG. 10, the user of the mobile device 110 selects the target mobile device 130 to send a lunch invitation message using a touch-and-slide input. Based on the user's selection, the mobile device 110 transmits the lunch invitation message encoded with a public key of the target mobile device 130. As such, although the lunch invitation message can be received by all mobile devices 120 and 130, only the target mobile device 130 can decode and display the lunch invitation message using a private key that is paired to the public key in the encoded message. The target mobile device 130 may transmit a sound signal carrying a response message encoded with a public key of the mobile device 110.

In some embodiments, the mobile device 110 may select a group of mobile devices displayed on the display unit 290 of the mobile device 110. The group of mobile devices may be a predetermined group stored in the mobile device 110, or may be selected based on one or more touch inputs received on the display unit 290 of the mobile device 110. For example, a plurality of mobile devices displayed on the display unit 290 may be selected based on a touch input for each of the plurality of mobile devices within a predetermined time. Alternatively, a user may select a group of mobile devices by performing a touch-and-drag motion on the display unit 290 to define a region that includes the group of mobile devices.

Figure 11:
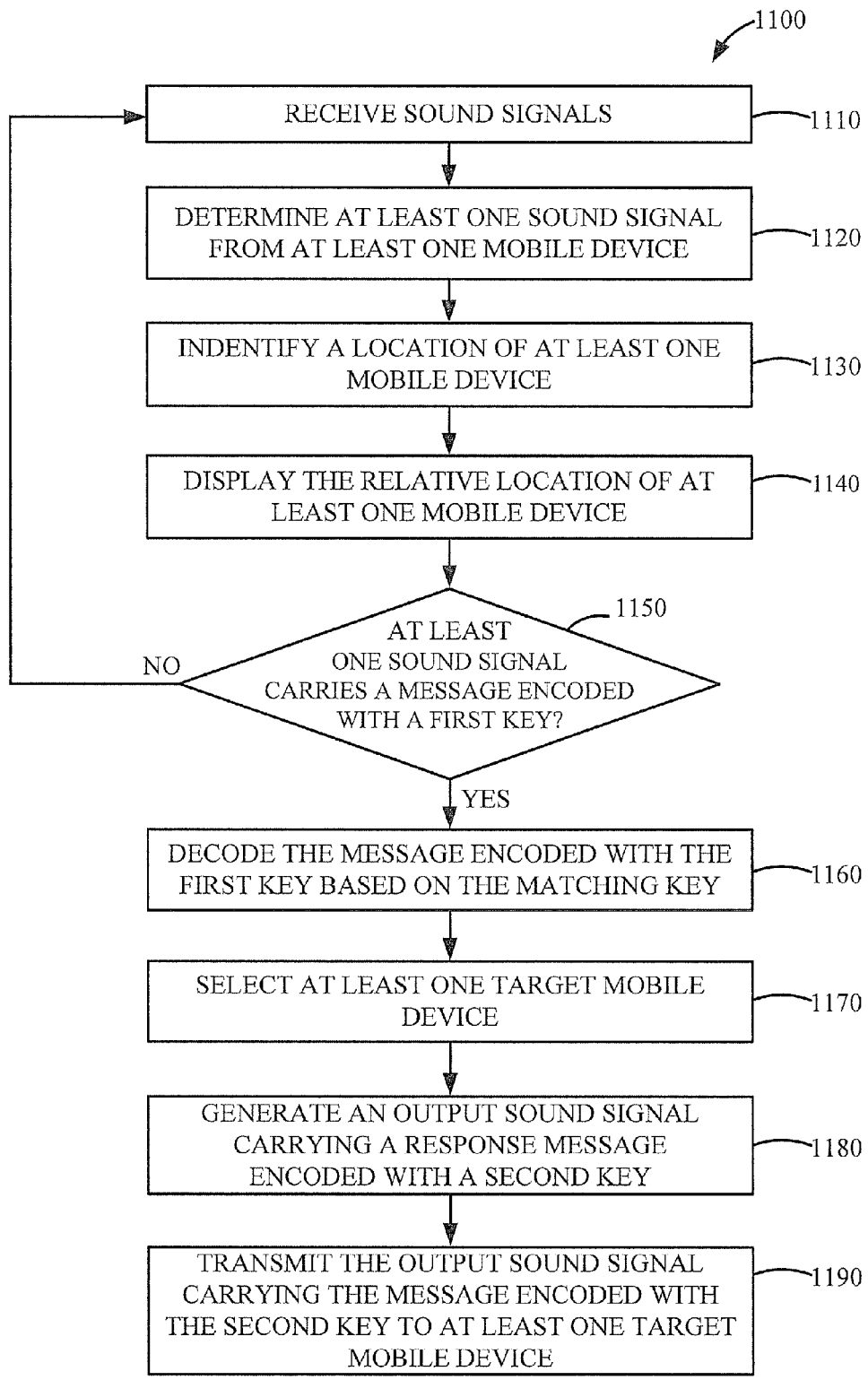
FIG. 11 is a flow chart illustrating a method, performed by a mobile device, for selecting a target mobile device and transmitting a sound signal carrying a message to the target mobile device according to one embodiment of the present disclosure.

FIG. 11 is a flow chart illustrating a method 1100, performed by the mobile device 110, for selecting a target mobile device and transmitting a sound signal carrying a message to the target mobile device according to one embodiment of the present disclosure. Initially, the mobile device 110 receives sound signals from at least one mobile device to determine that at least one sound signal from at least one mobile device is received in the sound communication region 100, at 1110. Among the received sound signals, the mobile device 110 detects at least one sound signal from at least one mobile device, at 1120. Then, the location of the at least one mobile device is identified using the beamforming technique based on the received sound signal, at 1130. The location of the at least one mobile device relative to the mobile device 110 is calculated and displayed on a display unit of the mobile device 110, at 1140.

In this configuration, the mobile device 110 then determines whether at least one sound signals carries a message encoded with a first key, at 1150. If so, the mobile device 110 searches for a matching key in its key database and decodes the message encoded with the first key based on a matching key that matches the first key, at 1160. In response to the first message, the mobile device 110 generates and encodes a response message with a second key obtained from the key database. In this case, the second key may be a public key of one or more intended target mobile devices if the response message is not intended for all mobile devices in the sound communication region 100.

In some other embodiments, the mobile device 110 may initially determine whether at least one sound signal carrying a message encoded with the first key is received. Then, the mobile device 110 may identify a location of a mobile device, from which the received sound signal originates, using the beamforming technique. The location of the sound signal originating mobile device relative to the mobile device 110 may be then calculated and displayed on a display unit of the mobile device 110.

Thereafter, the user of the mobile device 110 selects at least one target mobile device, which is the intended recipient of the response message, displayed on the display unit of the mobile device 110, at 1170. Then, the mobile device 110 generates an output sound signal carrying the response message encoded with the second key, at 1180. As discussed above, the target mobile device may be a group of mobile devices or the mobile devices 120 and/or 130. The mobile device 110 transmits the output sound signal carrying the response message encoded with the second key to the target mobile device, at 1190. Therefore, it is possible to select at least one target mobile device with which a user of a mobile device can enjoy private conversations.

Figure 12:
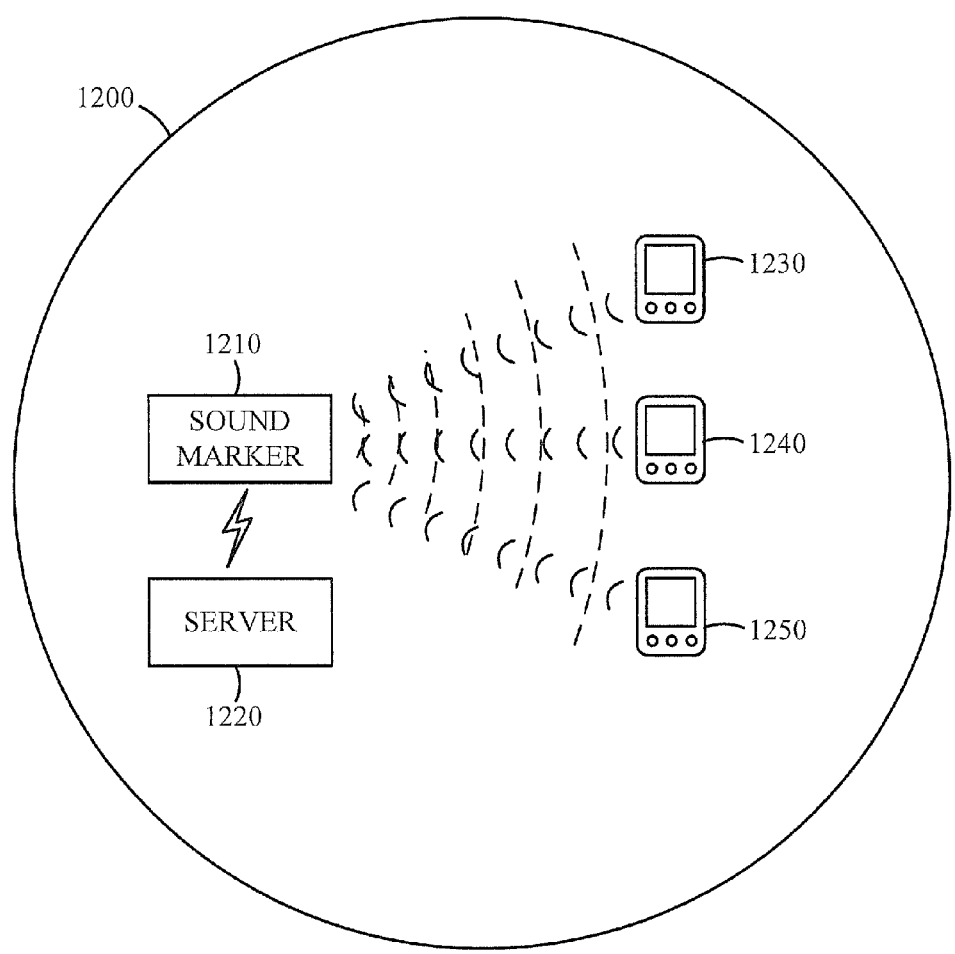
FIG. 12 illustrates a diagram of mobile devices communicating messages with a sound marker using sound signals in a sound communication region according to one embodiment of the present disclosure.

FIG. 12 illustrates a diagram of mobile devices 1230, 1240, and 1250 communicating messages with a sound marker 1210 using sound signals in a sound communication region 1200 according to one embodiment of the present disclosure. The sound marker 1210 is configured to transmit messages to and receive response messages from the mobile devices 1230, 1240, and 1250. Further, the sound marker 1210 may be configured to relay messages between the mobile devices 1230, 1240, and 1250, and a server 1220 which may be coupled to the sound marker 1210 via a network connection. To communicate using sound signals, the sound marker 1210 includes at least a sound receiver and a sound transmitter, whose functions and components are similar to the sound receiver 210 and the sound transmitter 280 in the mobile device 110.

In one embodiment, the sound marker 1210 includes a network communication interface for relaying messages among the mobile devices 1230, 1240, and 1250 and the server 1220. The server 1220 includes a network communication interface to communicate messages with the sound marker 1210 and may include a sound signal analyzer, a decoding unit, a key database, a sound signal generator, an encoding unit, and a control unit, which are similar to the components 210 to 280 as described with reference to the mobile device 110 in FIG. 2. The server 1220 is configured to decode, store, and/or organize the messages from 1230, 1240 and 1250 relayed through the sound marker 1210. Further, the server 1220 may be configured to manage the sound marker 1210 to transmit sound signals to the mobile devices 1230, 1240, and 1250.

In this case, a public key of the sound marker 1210 may be used for encoding messages from the mobile devices 1230, 1240, and 1250. In another embodiment, the sound marker 1210 may include all components of the mobile device 110 in FIG. 2, and may have its own public and private keys. Additionally, the sound marker 1210 and the server 1220 may be combined in one unit. For example, the sound marker 1210 may be a portable computing device such as a tablet PC, a smart-phone, a gaming device, and the like, or a stationary computing device including a personal computer and the like. Further, although the server 1220 is illustrated within the sound communication region 1200, the server 1220 may be located remotely outside of the sound communication region 1200.

In some embodiments, the mobile devices 1230, 1240, and 1250, and the sound marker 1210 coupled to the server 1220 are configured to communicate manually or automatically when the mobile devices 1230, 1240, and 1250 are present in the sound communication region 1200. For example, the sound marker 1210 may transmit a sound signal carrying an encoded broadcast message in the sound communication region 1200. In this case, the broadcast message may be encoded with a broadcast public key since the broadcast message is intended for all mobile devices in the sound communication region 1200. When the mobile devices 1230, 1240, and 1250 are present in the sound communication region 1200 and detect the sound signal from the sound marker 1210, each of the mobile devices 1230, 1240, and 1250 may transmit a response sound signal including a message encoded with a public key of the sound marker 1210. The public key of the sound marker 1210 may be obtained from a key database of the respective mobile devices 1230, 1240, and 1250 or may be included in the broadcast message embedded in the sound signal received from the sound marker 1210.

Figure 13:
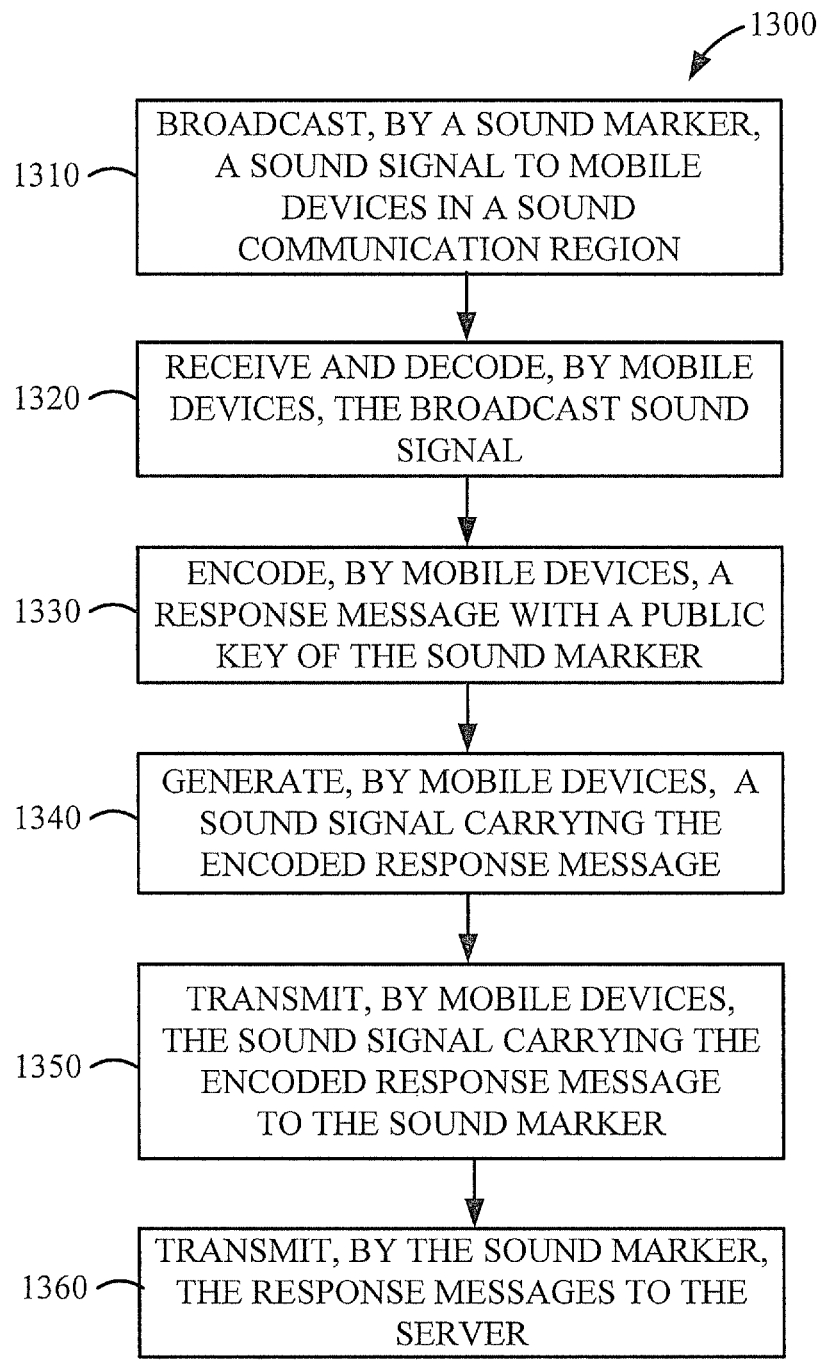
FIG. 13 is a flow chart illustrating a method for communicating messages among mobile devices and the sound marker in a sound communication system in according to one embodiment of the present disclosure.

FIG. 13 is a flow chart illustrating a method 1300 of communicating messages among the mobile devices 1230, 1240, and 1250, and the sound marker 1210 in a sound communication region 1200 according to one embodiment of the present disclosure. As described above, the server 1220 is coupled to the sound marker 1210. Initially, the sound marker 1210 broadcasts a sound signal encoded with a broadcast public key to the mobile devices 1230, 1240, and 1250 in the sound communication region 1200, at 1310. The mobile devices 1230, 1240, and 1250 then receive and decode the broadcast sound signal, at 1320. In some embodiments, the mobile devices 1230, 1240, and 1250 may initially be in an idle state, and are activated based on the broadcast sound signal from the sound marker 1210.

In response to the broadcast sound signal from the sound marker 1210, the mobile devices 1230, 1240, and 1250 generate and encode a response message with a public key of the sound marker 1210, at 1330. The public key of the sound marker 1210 may be stored in each of the mobile devices 1230, 1240, and 1250, or may be included in the message embedded in the sound signal broadcast from the sound marker 1210. Each of the mobile devices 1230, 1240, and 1250 then generates a sound signal carrying the encoded response message, at 1340. The sound signals from the mobile devices 1230, 1240, and 1250 are transmitted to the sound marker 1210, at 1350. Then, the sound marker 1210 decodes the response messages embedded in the received sound signals with a private key, which is paired to the public key of the sound marker 1210, and transmits the decoded response messages to the server 1220, at 1360. The server 1220 then may store and/or organize the response messages, as necessary.

For example, an attendance check in a class in school may be performed using the above method including the sound marker 1210. In this example, the sound marker 1210 broadcasts a beacon signal such as a sound signal in order to check attendance in a classroom. Each student with a mobile device in the classroom automatically or manually must respond to the beacon signal from the sound marker 1210 to receive credit for attending the class. Thus, in response to the beacon signal, each student must generate and encode a message including his student identification information with a public key of the sound marker 1210 received from the sound marker 1210. Then, the mobile device transmits the encoded message embedded in a sound signal, which is intended for the sound marker 1210, is transmitted. After the sound marker 1210 receives the encoded message, it is transmitted to the server 1220. The server 1220 extracts and stores the student identification information from the transmitted messages so that a list of students attending the class may be created. Further, the sound marker 1210 in cooperation with the server 1220 may check whether all students are present in the classroom by periodically broadcasting a beacon signal.

Another example of using the sound marker 1210 may be in an anonymous voting. Ballots of people present in the sound communication region 1200 may be transmitted to the sound marker 1210 using beacon signals such as sound signals. The ballots then are transmitted to the server 1220 to be counted. In another example, the sound marker 1210 may be used to count a number of people who visited a specific place, such as a restaurant.

Figure 14:
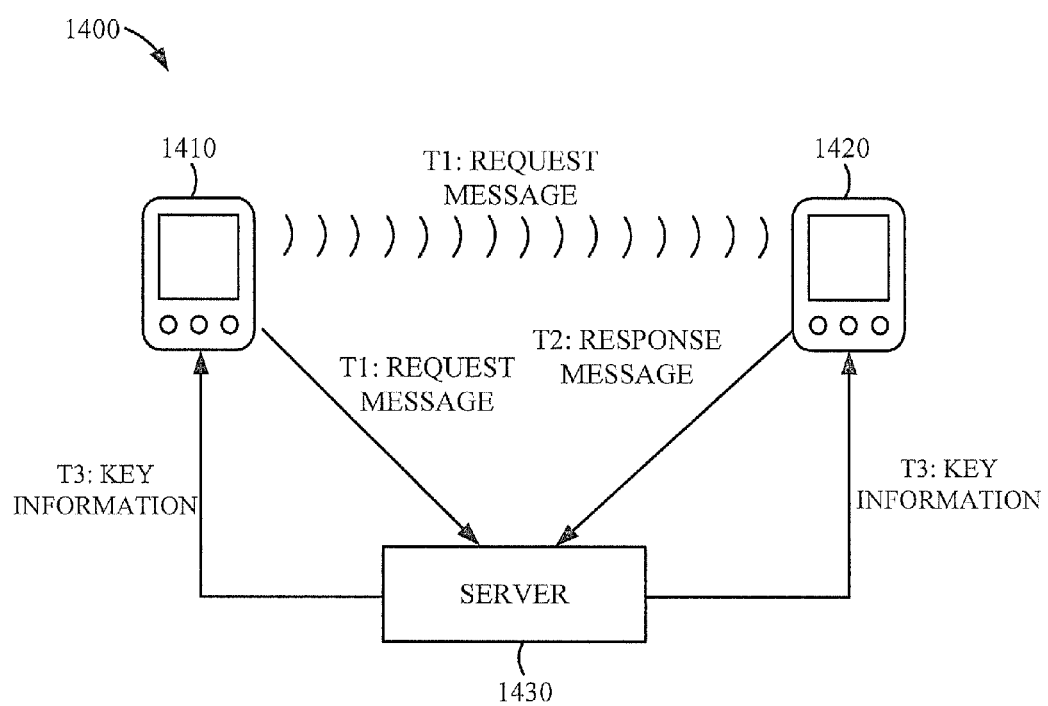
FIG. 14 illustrates a diagram of a sound communication system in which mobile devices are configured to discover communication keys through a server according to one embodiment of the present disclosure.

FIG. 14 illustrates a diagram of a sound communication system 1400 in which mobile devices 1410 and 1420 are configured to discover communication keys through a server 1430 according to one embodiment of the present disclosure. Initially, at time T1, the mobile device 1410 broadcasts a sound signal carrying a request message to communicate with any mobile device in its vicinity. In addition, the mobile device 1410 transmits a request message to the server 1430 that includes the broadcast message via a wireless network. The mobile device 1420, which is located within a sound communication region of the mobile device 1410, receives the sound signal including the request message broadcast from the mobile device 1410, and at time T2, transmits a response message to the server 1430 that includes the broadcast sound signal from the mobile device 1410.

The server 1430 is configured to determine whether the mobile devices 1410 and 1420 are located sufficiently close to each other. For example, the server 1430 compares the broadcast request message from the mobile device 1410 and the broadcast request message in contained in the response message received from the mobile device 1420. Based on the comparison, the server 1430 determines whether the two messages match within a predetermined error margin. That is, the server 1430 receives and compares the sound signal from the mobile device 1410 and the respond message including the broadcast sound signal from the mobile device 1420. If the two sound signals are sufficiently similar, the mobile device 1420 is determined to be located within the sound communication region of the mobile device 1410. In other words, the server 1430 determines that if the mobile device 1420 is able to receive sound signals from the mobile device 1410, the two mobile devices must be located within the sound communication region of the mobile device 1410.

The server 1430 is configured to maintain a key database of the mobile devices 1410 and 1420 for sound communication. The key database may include public/private keys of one or more intended target mobile devices, broadcast public/private keys, and/or One Time Passwords (OTPs) such as RSA keys, of mobile devices including the mobile devices 1410 and 1420. When the mobile device 1420 is determined to be located within the sound communication region of the mobile device 1410, the server 1430 transmits a key selected from the key database to the mobile devices 1410 and 1420, at time T3. For example, the server 1430 may transmit a public key of the mobile device 1420 to the mobile device 1410. In addition, the server 1430 may also transmit a public key of the mobile device 1410 to the mobile device 1420. The mobile devices 1410 and 1420 may then communicate messages encoded with the discovered keys via a sound medium.

In some embodiments, the mobile devices 1410 and 1420 may transmit at T1 and T2, respectively, a message to the server 1430 including information indicating the locations of the respective devices. For example, each of the mobile devices 1410 and 1420 may transmit its geographical coordinates (e.g., GPS coordinates), a photograph of its environment, and/or time at which the message is transmitted to the server 1430. The server 1430 then compares the messages from the mobile devices 1410 and 1420 and determines whether the mobile device 1420 is located within the sound communication region of the mobile device 1410. Based on the result of the comparison, the server 1430 transmits suitable keys to the mobile devices 1410 and 1420 for sound communication as described above.

Figure 15:
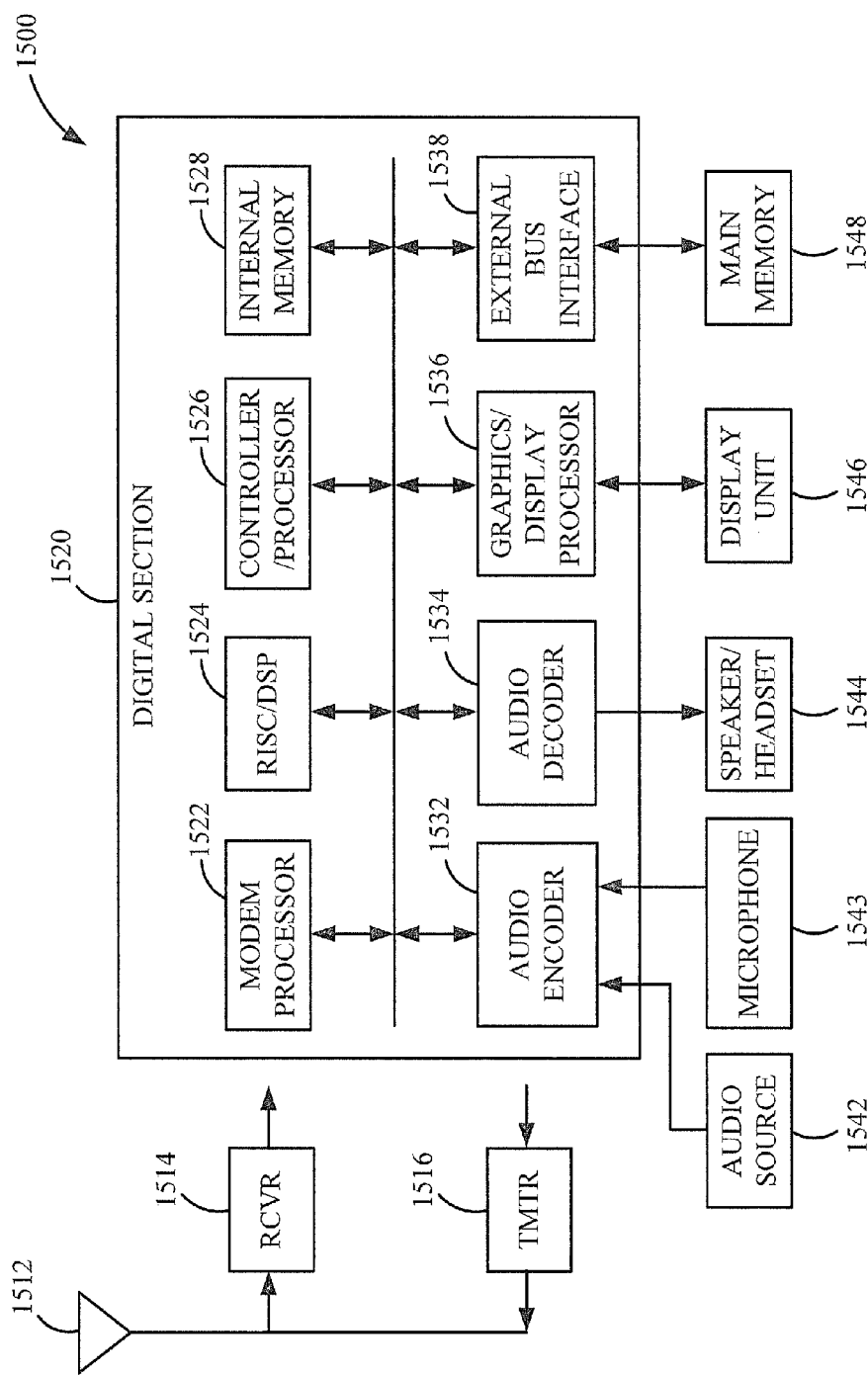
FIG. 15 is a block diagram of an exemplary mobile device in which the methods and apparatus for communicating messages of the present disclosure may be implemented according to some embodiments of the present disclosure.

FIG. 15 illustrates a configuration of an exemplary mobile device 1500 in which the method or application of the present disclosure may be executed. The configuration of the mobile device 1500 may be implemented in the mobile devices according to the above embodiments described with reference to FIGS. 1 to 14. The mobile device 1500 may be a cellular phone, a smartphone, a terminal, a handset, a personal digital assistant (PDA), a wireless modem, a cordless phone, etc. The wireless communication system may be a Code Division Multiple Access (CDMA) system, a Broadcast System for Mobile Communications (GSM) system, Wideband CDMA (WCDMA) system, Long Term Evolution (LTE) system, LTE Advanced system, etc. Further, the mobile device 1500 may communicate directly with another mobile device, e.g., using Wi-Fi Direct, Bluetooth, or FlashLinq technology.

The mobile device 1500 is capable of providing bidirectional communication via a receive path and a transmit path. On the receive path, signals transmitted by base stations are received by an antenna 1512 and are provided to a receiver (RCVR) 1514. The receiver 1514 conditions and digitizes the received signal and provides samples such as the conditioned and digitized digital signal to a digital section for further processing. On the transmit path, a transmitter (TMTR) 1516 receives data to be transmitted from a digital section 1520, processes and conditions the data, and generates a modulated signal, which is transmitted via the antenna 1512 to the base stations. The receiver 1514 and the transmitter 1516 may be part of a transceiver that may support CDMA, GSM, LTE, LTE Advanced, etc.

The digital section 1520 includes various processing, interface, and memory units such as, for example, a modem processor 1522, a reduced instruction set computer/digital signal processor (RISC/DSP) 1524, a controller/processor 1526, an internal memory 1528, a generalized audio encoder 1532, a generalized audio decoder 1534, a graphics/display processor 1536, and an external bus interface (EBI) 1538. The modem processor 1522 may perform processing for data transmission and reception, e.g., encoding, modulation, demodulation, and decoding. The RISC/DSP 1524 may perform general and specialized processing for the mobile device 1500. The controller/processor 1526 may perform the operation of various processing and interface units within the digital section 1520. The internal memory 1528 may store data and/or instructions for various units within the digital section 1520.

The generalized audio encoder 1532 may perform encoding for input signals from an audio source 1542, a microphone 1543, etc. The generalized audio decoder 1534 may perform decoding for coded audio data and may provide output signals to a speaker/headset 1544. The graphics/display processor 1536 may perform processing for graphics, videos, images, and texts, which may be presented to a display unit 1546. The EBI 1538 may facilitate transfer of data between the digital section 1520 and a main memory 1548.

The digital section 1520 may be implemented with one or more processors, DSPs, microprocessors, RISCs, etc. The digital section 1520 may also be fabricated on one or more application specific integrated circuits (ASICs) and/or some other type of integrated circuits (ICs).

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For a firmware and/or software implementation, the techniques may be embodied as instructions stored on a computer-readable medium, such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, or the like. The instructions may be executable by one or more processors and may cause the processor(s) to perform certain aspects of the functionality described herein.

If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium.

For example, if the software is transmitted from a website, a server, or other remote source using a coaxial cable, fiber optic cable, twisted pair, digital subscriber line (DSL), or wireless technologies such as infrared, radio, and microwave, then the coaxial cable, the fiber optic cable, the twisted pair, the DSL, or wireless technologies such as infrared, radio, and microwave are included in the definition of medium. Disk and disc, as used herein, includes CD, laser disc, optical disc, digital versatile disc (DVD), floppy disk and blu-ray disc where disks usually reproduce data magnetically, while discs reproduce data optically with lasers. Combinations of the above should also be included within the scope of computer-readable media.

A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. Alternatively, the storage medium may be integral to the processor. The processor and the storage medium may reside in an ASIC. The ASIC may reside in a user terminal. Alternatively, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for communicating messages by a first mobile device via a sound medium, comprising:
   receiving, by the first mobile device, input sounds from a plurality of mobile devices via the sound medium;
   detecting a user input indicating a user selection of multiple mobile devices of the plurality of mobile devices, wherein the multiple mobile devices include a particular mobile device, and wherein the user input includes a touch and drag action on a touch sensitive screen of the first mobile device;
   in response to detecting, from the input sounds, an input sound signal carrying a first message encoded with a first key:
     decoding the first message using a matching key; and
     generating an output sound signal carrying a second message encoded with a second key, wherein the second key comprises a public key to which a private key is paired, and wherein the private key is included in the particular mobile device; and
   transmitting, by the first mobile device, an output sound corresponding to the output sound signal via the sound medium.

2. The method of claim 1, wherein the private key is included in each of the multiple mobile devices.

3. The method of claim 1, wherein the input sound signal is received from a particular second mobile device of the plurality of mobile devices, and wherein the particular second mobile device is distinct from the particular mobile device.

4. The method of claim 1, further comprising, prior to generating the output sound signal:
   transmitting a first request sound via the sound medium to the particular mobile device;
   transmitting a first server message, via a communication network, to a server, wherein the particular mobile device sends a second server message to the server in response to receiving the first request sound; and
   receiving, via the communication network, the second key from the server, wherein the server transmits the second key to the first mobile device and the first key to the particular mobile device based on a comparison of the first server message and the second server message.

5. The method of claim 4, wherein the first server message includes at least one of first global positioning system (GPS) coordinates, a first photograph, or a first time, wherein the second server message includes at least one of second GPS coordinates, a second photograph, or a second time, and wherein the server transmits the second key to the first mobile device and the first key to the particular mobile device based on a comparison of the first GPS coordinates and the second GPS coordinates, a comparison of the first photograph and the second photograph, or a comparison of the first time and the second time.

6. The method of claim 4, wherein the first request sound corresponds to a first request sound signal carrying a first request message, wherein the first server message includes the first request sound signal, wherein the second server message includes a second request sound signal corresponding to the first request sound signal received by the particular mobile device, and wherein the server transmits the second key to the first mobile device and the first key to the particular mobile device based on a comparison of the first request sound signal and the second request sound signal.

7. The method of claim 1, further comprising determining, from the input sounds, a direction of the particular mobile device relative to the first mobile device, and wherein the output sound is transmitted in the direction of the particular mobile device by a plurality of speakers.

8. The method of claim 1, further comprising transitioning from a sleep mode to an active operating mode of the first mobile device in response to detecting the input sound signal carrying the first message.

9. The method of claim 1,
wherein transmitting the output sound includes transmitting the output sound to the particular mobile device,
wherein the user input includes a touch and slide action on a touch sensitive screen in a direction from the first mobile device towards the particular mobile device, and
wherein the input sound signal corresponds to an inaudible sound.

10. An apparatus for communicating messages via a sound medium, comprising:
a processor configured to receive a user input indicating a user selection of a particular mobile device;
a sound transmitter configured to:
transmit a first request sound via the sound medium to the particular mobile device; and
transmit an output sound corresponding to an output sound signal via the sound medium;
a network transmitter configured to transmit a first server message, via a communication network, to a server, wherein the particular mobile device sends a second server message to the server in response to receiving the first request sound;
a sound receiver configured to receive input sounds from at least one mobile device via the sound medium and to convert the input sounds into electrical sound signals;
a sound signal analyzer configured to detect, from the electrical sound signals, a signal carrying a first message encoded with a first key, wherein the first message includes a hyperlink;
a decoding unit configured to decode the first message using a matching key;
a network receiver configured to receive, via the communication network, a second key from the server, wherein the server transmits the second key to the apparatus and transmits the first key to the particular mobile device based on a comparison of the first server message and the second server message; and
a sound signal generator configured to, in response to the sound signal analyzer detecting the signal carrying the first message encoded with the first key, generate the output sound signal carrying a second message encoded with the second key, wherein the second key comprises a public key paired to a private key, and wherein the private key is included in the particular mobile device.

11. The apparatus of claim 10, wherein the at least one mobile device includes a plurality of mobile devices, wherein the public key comprises a broadcast public key, wherein the private key comprises a broadcast private key, and wherein the private key is included in each of the plurality of mobile devices.

12. The apparatus of claim 10, wherein the sound signal generator is further configured to select a frequency band of a plurality of non-overlapping frequency bands based on traffic, and wherein the output sound is transmitted in the frequency band.

13. The apparatus of claim 10, wherein the sound signal analyzer is further configured to:
identify a location of each of the at least one mobile device based on the electrical sounds, and
display, on a screen of the apparatus, information related to the location of each of the at least one mobile device relative to the apparatus.

14. The apparatus of claim 10, wherein the sound transmitter is configured to transmit the output sound signal to the particular mobile device.

15. The apparatus of claim 10, wherein the processor is configured to receive the user input from a touch sensitive screen of the apparatus.

16. The apparatus of claim 15, wherein the user input includes a touch and slide action on the touch sensitive screen in a direction from the apparatus towards the particular mobile device.

17. The apparatus of claim 10, wherein the sound medium comprises air.

18. The apparatus of claim 10, wherein the signal corresponds to an inaudible sound.

19. An apparatus for communicating messages via a sound medium, comprising:
means for receiving input sounds from a plurality of mobile devices via the sound medium;
means for detecting, from the input sounds, an input sound signal carrying a first message encoded with a first key, wherein the first message includes a hyperlink;
means for decoding the first message using a matching key;
means for detecting a user input indicating a user selection of multiple mobile devices of the plurality of mobile devices, wherein the multiple mobile devices include a particular mobile device, and wherein the user input includes a touch and drag action on a touch sensitive screen of the apparatus;
means for generating an output sound signal in response to detecting the input sound signal carrying the first message encoded with the first key, the output sound signal carrying a second message encoded with a second key, wherein the second key comprises a public key paired to a private key, and wherein the private key is included in the particular mobile device; and
means for transmitting an output sound corresponding to the output sound signal via the sound medium.

20. The apparatus of claim 19, wherein the private key is included in each of the plurality of mobile devices.

21. The apparatus of claim 19, wherein the input sound signal is received from a second mobile device of the plurality of mobile devices, and wherein the second mobile device is distinct from the particular mobile device.

22. The apparatus of claim 19, further comprising:
means for identifying a location of a particular second mobile device of the plurality of mobile devices based on the input sounds; and
means for displaying the location of the particular second mobile device relative to the apparatus.

23. The apparatus of claim 19, further comprising means for transmitting the output sound to the particular mobile device.

24. The apparatus of claim 19, wherein the touch and drag action on the touch sensitive screen is in a direction from the apparatus towards the particular mobile device.

25. The apparatus of claim 19, further comprising means for adjusting an operating mode of the apparatus in response to detecting the input sound signal carrying the first message.

26. The apparatus of claim 19, wherein the input sound signal corresponds to an inaudible sound.

27. A computer-readable storage device storing instructions for communicating messages via a sound medium, the instructions executable by a processor to perform operations comprising:
   detecting, at a first mobile device, a user input indicating a user selection of a particular mobile device;
   transmitting a first request sound via the sound medium to the particular mobile device;
   transmitting a first server message, via a communication network, to a server, wherein the particular mobile device sends a second server message to the server in response to receiving the first request sound;
   receiving, at the first mobile device, input sounds from at least one second mobile device via the sound medium;
   decoding a first message using a matching key in response to detecting, from the input sounds, an input sound signal carrying the first message encoded with a first key;
   receiving, via the communication network, a second key from the server, wherein the server transmits the second key to the first mobile device and transmits the first key to the particular mobile device based on a comparison of the first server message and the second server message; and
   generating an output sound signal carrying a second message encoded with the second key, wherein the second key comprises a public key to which a private key is paired, and wherein the private key is included in the particular mobile device.

28. The computer-readable storage device of claim 27, wherein the operations further comprise sending an electronic signal to a transmitter, the electronic signal corresponding to the output sound signal.

29. The computer-readable storage device of claim 27, wherein the operations further comprise:
   selecting, at the first mobile device, a time based on traffic; and
   transmitting, from the first mobile device, the output sound signal at the selected time.

30. The computer-readable storage device of claim 27, wherein the operations further comprise:
   identifying, by the first mobile device, a location of each of the at least one second mobile device based on the input sounds; and
   displaying, on a screen of the first mobile device, the location of each of the at least one second mobile device relative to the first mobile device.

31. The computer-readable storage device of claim 27, wherein the operations further comprise transmitting the output sound to the particular mobile device.

32. The computer-readable storage device of claim 27, wherein the user input is detected on a touch sensitive screen of the first mobile device.

33. The computer-readable storage device of claim 32, wherein the user input includes a touch and slide action on the touch sensitive screen in a direction from the first mobile device towards the particular mobile device.

34. The computer-readable storage device of claim 27, further comprising adjusting an operating mode of the first mobile device in response to detecting the input sound signal carrying the first message.

35. The computer-readable storage device of claim 27, wherein the input sound signal corresponds to an inaudible sound.

36. A system for communicating messages among a plurality of mobile devices via a sound medium, comprising:
   a first mobile device configured to:
      detecting a user input indicating a user selection of multiple mobile devices of the plurality of mobile devices, wherein the user input includes a touch and drag action on a touch sensitive screen of the first mobile device, and wherein the multiple mobile devices include a second mobile device;
      transmit a first sound signal carrying a first message encoded with a first key to the plurality of mobile devices, wherein the first key comprises a public key to which a private key is paired;
      receive a second sound signal carrying a second message encoded with a second key from the second mobile device;
      generate a decoded message by decoding the second message using a matching key paired to the second key; and
      transmit the decoded message, via a communication network, to a server.

37. The system of claim 36, wherein the second sound signal carrying the second message encoded with the second key is generated by the second mobile device in response to receiving the first sound signal carrying the first message encoded with the first key, and wherein the second mobile device is configured to decode the first message using a first matching key paired to the first key.

38. The system of claim 36, wherein the first key comprises a broadcast public key, wherein a first matching key is paired to the first key, wherein the first matching key comprises a broadcast private key, and wherein each of the plurality of mobile devices includes the first matching key.

39. The system of claim 36, wherein the second key comprises a public key, and wherein the matching key comprises a private key included in the first mobile device.

40. The system of claim 36, wherein the second mobile device is further configured to, in response to receiving the first sound signal, identify a location of the first mobile device based on the first sound signal and to display the location of the first mobile device relative to the second mobile device on a screen of the second mobile device.

41. The system of claim 40, wherein the second mobile device is further configured to transmit the second sound signal to the first mobile device in response to receiving a user input indicating a user selection of the first mobile device, wherein the second key comprises a public key, and wherein the matching key comprises a private key included in the first mobile device.

42. The system of claim 41, wherein the user input is detected on a touch sensitive screen of the second mobile device.

43. The system of claim 42, wherein the user input includes a touch and slide action on the touch sensitive screen in a direction from the second mobile device towards the first mobile device.

44. The system of claim 36, wherein the second mobile device is configured to adjust an operating mode of the second mobile device in response to receiving the first sound signal carrying the first message.

45. The system of claim 36, wherein the decoded message includes a ballot, an attendance message, or a user identifier.

46. The system of claim 36, further comprising a second server configured to store a key database including the first key and the second key of the first mobile device and the second mobile device, respectively, wherein the first key and the second key are transmitted from the second server to the first mobile device and to the second mobile device, respectively, for encoding the first message and the second message.

* * * * *